United States Patent
Kang et al.

(10) Patent No.: US 11,972,578 B2
(45) Date of Patent: Apr. 30, 2024

(54) METHOD AND SYSTEM FOR OBJECT TRACKING USING ONLINE TRAINING

(71) Applicant: NAVER CORPORATION, Seongnam-si (KR)

(72) Inventors: Myunggu Kang, Seongnam-si (KR); Dongyoon Wee, Seongnam-si (KR); Soonmin Bae, Seongnam-si (KR)

(73) Assignee: NAVER CORPORATION, Seongnam-si (KR)

( * ) Notice: Subject to any disclaimer, the term of this patent is extended or adjusted under 35 U.S.C. 154(b) by 361 days.

(21) Appl. No.: 17/458,896

(22) Filed: Aug. 27, 2021

(65) Prior Publication Data

US 2021/0390347 A1 Dec. 16, 2021

Related U.S. Application Data

(63) Continuation of application No. PCT/KR2020/001866, filed on Feb. 11, 2020.

(30) Foreign Application Priority Data

Feb. 28, 2019 (KR) ........................ 10-2019-0023916

(51) Int. Cl.
*G06T 7/246* (2017.01)
*G06F 18/214* (2023.01)
*G06F 18/22* (2023.01)
*G06F 18/2413* (2023.01)
*G06N 20/00* (2019.01)
*G06T 7/73* (2017.01)
(Continued)

(52) U.S. Cl.
CPC .......... *G06T 7/251* (2017.01); *G06F 18/2148* (2023.01); *G06T 7/246* (2017.01); *G06T 7/73* (2017.01); *G06V 10/62* (2022.01); *G06V 20/48* (2022.01)

(58) Field of Classification Search
CPC ........... G06T 7/251; G06T 7/246; G06T 7/73; G06T 2207/20081; G06T 2207/20084; G06T 2207/30196; G06F 18/2148; G06F 18/22; G06F 18/2413; G06V 10/62; G06V 20/48; G06V 20/41; G06N 20/00
See application file for complete search history.

(56) References Cited

U.S. PATENT DOCUMENTS 9,600,717 B1\* 3/2017 Dai .................... G06V 40/20
2008/0112592 A1\* 5/2008 Wu ..................... G06V 40/10
382/103

FOREIGN PATENT DOCUMENTS

JP 2006343791 A 12/2006
JP 2016066187 A 4/2016
(Continued)

OTHER PUBLICATIONS

Zhu et al., "Tracking Multiple Objects Through Occlusion with Online Sampling and Position Estimation," Aug. 2008, Pattern Recognition, vol. 41, pp. 2447-2460 (Year: 2008).*
(Continued)

*Primary Examiner* — John W Lee
(74) *Attorney, Agent, or Firm* — Greer Burns & Crain Ltd.

(57) ABSTRACT

A method and system for tracking an object in an input video using online training includes a step for training a classifier model by using global pattern matching, and a step for classifying and tracking each target through online training including the classifier model.

9 Claims, 5 Drawing Sheets

(51) Int. Cl.
  *G06V 10/62* (2022.01)
  *G06V 20/40* (2022.01)

(56) References Cited

FOREIGN PATENT DOCUMENTS

| | | | |
|---|---|---|---|
| JP | 2017010224 A | 1/2017 |
| JP | 2017117139 A | 6/2017 |
| KR | 1020060009874 A | 2/2006 |
| KR | 1020080073933 A | 8/2008 |
| KR | 1020130073812 A | 7/2013 |
| KR | 1020170137350 A | 12/2017 |
| KR | 1020180009180 A | 1/2018 |

OTHER PUBLICATIONS

Liang Zheng et al., "MARS: A Video Benchmark for Large-Scale Person Re-Identification", online, Sep. 17, 2016, https://link.springer.com/chapter/10.1007/978-3-319-46466-4_52.
Office Action issued in corresponding Japanese patent application No. 2021-549487, dated Aug. 2, 2022.
ISR issued in PCT/KR2020/001866, dated May 20, 2020.

\* cited by examiner

1. Model Results

2. Separate valid period from invalid period within entire video

FIG. 7

METHOD AND SYSTEM FOR OBJECT TRACKING USING ONLINE TRAINING

CROSS-REFERENCE TO RELATED APPLICATIONS

This is a continuation application of International Application No. PCT/KR2020/001866, filed Feb. 11, 2020, which claims the benefit of Korean Patent Application No. 10-2019-0023916, filed Feb. 28, 2019.

BACKGROUND OF THE INVENTION

Field of Invention

One or more example embodiments of the following description relate to object tracking technology.

Description of Related Art

Object pose estimation is an important topic in computer vision, human-machine interaction, and other related fields. For example, when a head of a user is regarded as an object to be estimated, abundant individuation information the user desires to express may be known by estimating the continuous head pose of the user. Also, results of estimating an object pose, for example, a head pose, may be used to perform human-machine interaction. For example, a gaze focus of a user may be acquired by estimating a head pose and a more effective human-machine interaction may be performed.

As an example of object pose estimation technology, technology for automatically tracking a movement of an object in an input video clip and determining the pose of the object is described in Korean Patent Laid-Open Publication No. 10-2008-0073933 (published on Aug. 12, 2008).

Current object pose estimation methods are generally classified into a tracking-based method and a training-based method.

The tracking-based method relates to estimating the pose of an object as a method of matching a single pair between a current frame and a previous frame in a video sequence.

The training-based method generally defines an object pose estimation using a classification method or a return method and estimates the pose of an object using a training model acquired by performing training through a sample including a label.

BRIEF SUMMARY OF THE INVENTION

One or more example embodiments of the present invention may include learning a global pattern of each target through an online training model to which a classifier for classifying an identification number (ID) of each target is added.

One or more example embodiments may include generating training data of each target that is accumulated with a time axis and train a classifier model using the same.

One or more example embodiments may include using both a motion factor according to a local pattern and an appearance factor according to a global pattern for tracking.

According to an aspect of at least one example embodiment, there is provided an object tracking method performed by a computer system including at least one processor configured to execute computer-readable instructions included in a memory, the object tracking method including, by the at least one processor, training a classifier model using global pattern matching; and classifying and tracking each target through online training including the classifier model.

According to one aspect, the training of the classifier model may include learning a global pattern of each target through a training model to which a classifier for classifying each target is added.

According to another aspect, the training of the classifier model may include generating training data of each target that is accumulated with a time axis through sample mining and repeatedly training the classifier model using the accumulated training data.

According to still another aspect, the training of the classifier model may include separating a valid period in which all the targets are present from an entire consecutive period of an input video; generating training data after labelling a single valid period among the valid periods and training the classifier model; and generating training data after labelling a next valid period, generating accumulated training data by merging the training data and previously generated training data, and repeatedly training the classifier model.

According to still another aspect, the labelling may include using a similarity matrix of the classifier model that is calculated based on an appearance factor according to a global pattern of a target.

According to still another aspect, the training further includes performing labelling through the classifier model trained using the valid period with respect to a period aside from the valid period.

According to still another aspect, the tracking may include finding a position of a target and calculating coordinates of a keypoint of each target with respect to all of the frames of an input video; calculating a matching score between targets in adjacent frames using the coordinates of the keypoint of each target; and performing pose matching between frames based on the matching score between the targets.

According to still another aspect, the performing of the pose matching may include performing the pose matching using a similarity matrix that is calculated based on a motion factor about a box representing a box of a target.

According to still another aspect, the matching score may represent a closeness level between a target of a previous frame and a target in a next frame.

According to still another aspect, the tracking may further include performing at least one postprocessing process among a process of removing an error of the pose matching through error measurement based on a bounding box representing a position of a target, a process of correcting the error of the pose matching using an interpolation, and a process of performing smoothing for the pose matching based on a moving average.

According to an aspect of at least one example embodiment, there is provided a non-transitory computer-readable recording medium storing a program for computer-implementing the object tracking method.

According to an aspect of at least one example embodiment, there is provided a computer system including a memory; and at least one processor configured to connect to the memory and to execute computer-readable instructions included in the memory. The at least one processor is configured to process training of a classifier model using global pattern matching; and classifying and tracking of each target through online training including the classifier model.

According to some example embodiments, it is possible to learn the global pattern of each target through an online training model to which a classifier for classifying an identification number (ID) of each target is added.

According to some example embodiments, it is possible to generate training data of each target that is accumulated with a time axis and to train a classifier model using the same.

According to some example embodiments, it is possible to use both a motion factor according to a local pattern and an appearance factor according to a global pattern for tracking.

DETAILED DESCRIPTION OF THE INVENTION

Hereinafter, example embodiments will be described with reference to the accompanying drawings.

The example embodiments relate to technology for tracking a position of an object through an online training model.

The example embodiments included in the disclosures herein may learn a global pattern of each target through an online training model to which a classifier for classifying an ID of each target is added and accordingly may achieve many advantages in terms of accuracy, efficiency, cost saving, and the like.

Figure 1:
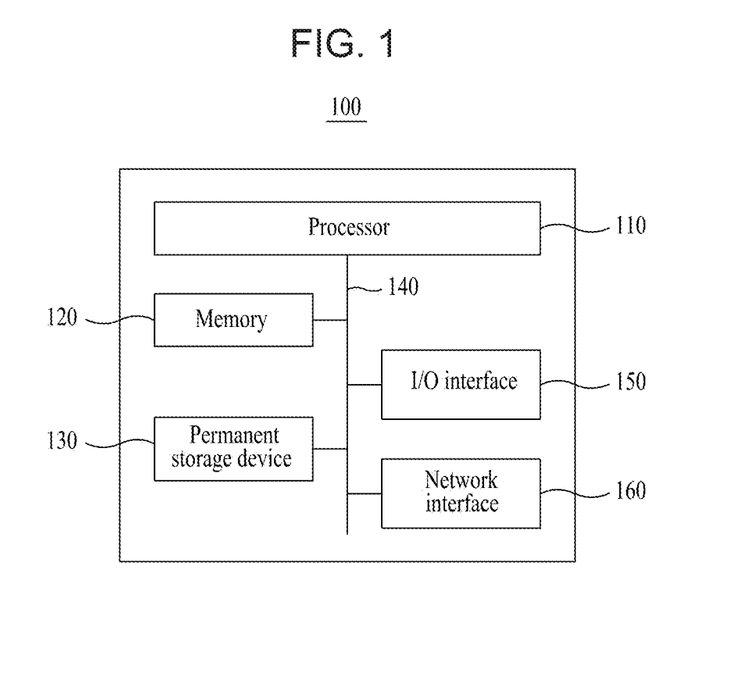
FIG. 1 is a block diagram illustrating an example of an internal configuration of a computer system according to an example embodiment.

FIG. 1 is a diagram illustrating an example of an internal configuration of a computer system according to an example embodiment. For example, an object tracking system according to example embodiments may be implemented through a computer system 100 of FIG. 1.

Referring to FIG. 1, the computer system 100 may include a processor 110, a memory 120, a permanent storage device 130, a bus 140, an input/output (I/O) interface 150, and a network interface 160 as components to perform an object tracking method.

The processor 110 may be capable of processing a sequence of instructions or a portion thereof as a component for object tracking. The processor 110 may include, for example, a computer processor, a processor in a mobile device or another electronic device, and/or a digital processor. The processor 110 may be included in, for example, a server computing device, a server computer, a series of server computers, a server farm, a cloud computer, and a content platform. The processor 110 may be connected to the memory 120 through the bus 140.

The memory 120 may include a volatile memory, a permanent memory, a virtual memory, or other memories to store information used by or output from the computer system 100. The memory 120 may include, for example, a random access memory (RAM) and/or a dynamic RAM (DRAM). The memory 120 may be used to store arbitrary information such as state information of the computer system 100. The memory 120 may be used to store instructions of the computer system 100 including, for example, instructions for object tracking. The computer system 100 may include at least one processor 110 as necessary or appropriate.

The bus 140 may include a communication-based structure that enables interaction between various components of the computer system 100. The bus 140 may convey data, for example, between the components of the computer system 100, for example, between the processor 110 and the memory 120. The bus 140 may include wireless and/or wired communication medium between the components of the computer system 100 and may include parallel, serial, or other topology arrangements.

The permanent storage device 130 may include a memory as used by the computer system 100 or components, such as other permanent storage devices, to store data during a predetermined extended period (for example, compared to the memory 120). The permanent storage device 130 may include a non-volatile main memory as used by the processor 110 within the computer system 100. The permanent storage device 130 may include, for example, a flash memory, a hard disk, or another computer readable record medium.

The I/O interface 150 may include interfaces for a keyboard, a mouse, a voice instruction input, a display, or another input or output device. Configuration instructions and/or input for object tracking may be received through the I/O interface 150.

The network interface 160 may include at least one interface for networks such as a local area network or the Internet. The network interface 160 may include interfaces for wired or wireless accesses. Configuration instructions and/or input for object tracking may be received through the network interface 160.

Also, according to other example embodiments, the computer system 100 may include a number of components greater than the number of components shown in FIG. 1. For example, the computer system 100 may be configured to include at least a portion of I/O devices connected to the I/O interface 150 or may further include other components, such as a transceiver, a global positioning system (GPS) module, a camera, various sensors, and a database.

In the case of performing object tracking in a real image, an object may be occluded by another object or may appear blurred due to fast movement. In this case, a comparison may not be properly performed, or the same objects may be recognized as different objects.

Due to the above reasons, the existing pose estimation used for object tracking is not 100% accurate and has limitation as being estimated as a similar position having a position pattern. Accordingly, the identification (ID) of a target may be shifted and if such small errors are accumulated, it may lead to the target object being missed.

The present invention may more accurately tracks a target object through an online training model (i.e., a learning model in the form of an online service) using global pattern matching.

Although human tracking is described as a representative example herein, it is provided as an example only and may apply to various types of things or other types of objects in addition to a human.

Figure 2:
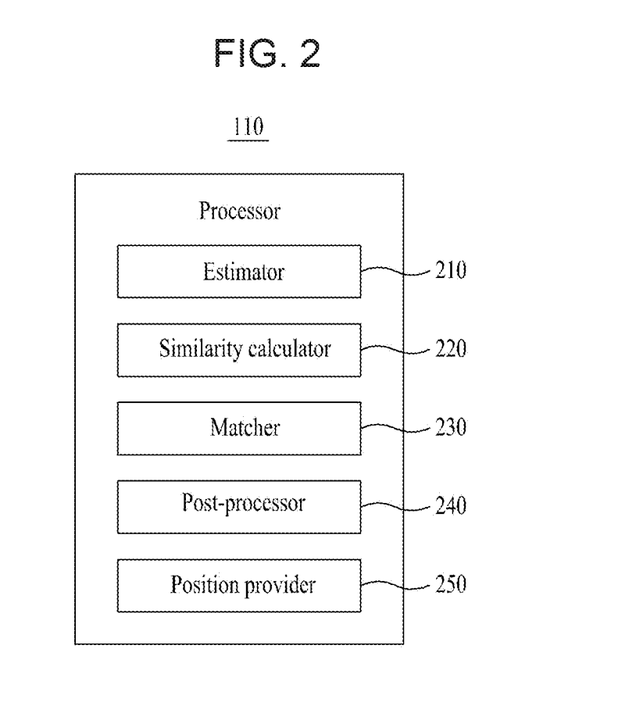
FIG. 2 is a block diagram illustrating an example of components includable in a processor of the computer system of FIG. 1 according to an example embodiment.
Figure 3:
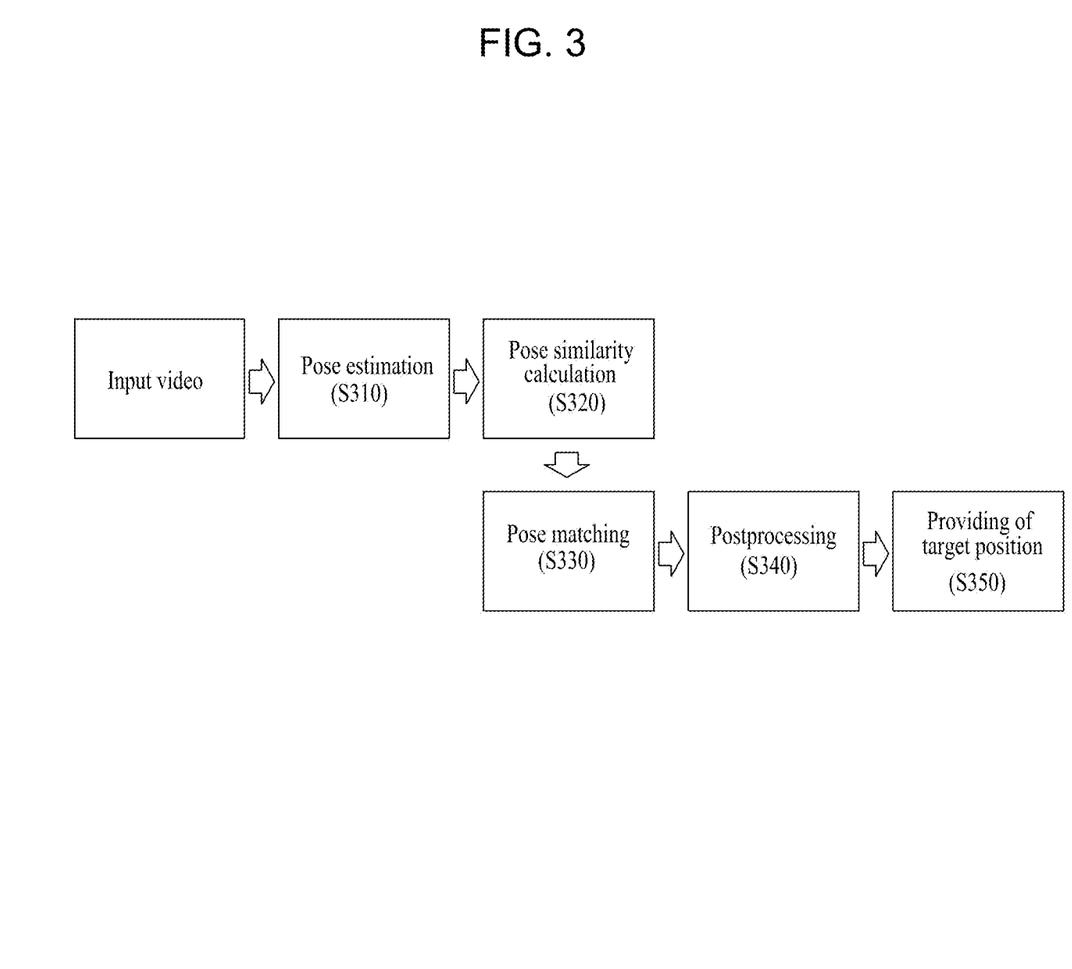
FIG. 3 is a flowchart illustrating an example of an object tracking method performed by the computer system of FIG. 1 according to an example embodiment.

FIG. 2 is a diagram illustrating an example of components includable in the processor of the computer system 100 according to an example embodiment, and FIG. 3 is a flowchart illustrating an example of an object tracking method performed by the computer system 100 according to an example embodiment.

Referring to FIG. 2, the processor 110 may include an estimator 210, a similarity calculator 220, a matcher 230, a post-processer 240, and a position provider 250. The components of the processor 110 may be representations of different functions performed by the processor 110 in response to a control instruction provided by at least one program code. For example, the estimator 210 may be used as a functional representation to control the computer system 100 such that the processor 110 may perform pose estimation.

The processor 110 and the components of the processor 110 may perform operations S310 to S350 included in the object tracking method of FIG. 3. For example, the processor 110 and the components of the processor 110 may be implemented to execute an instruction according to the at least one program code and a code of an OS included in the memory 120. Here, the at least one program code may correspond to a code of a program implemented to process the object tracking method.

The object tracking method may not be performed in illustrated order and a portion of operations may be omitted or an additional process may be further included.

The processor 110 may load, to the memory 120, a program code stored in a program file for the object tracking method. For example, the program file for the object tracking method may be stored in the permanent storage device 130 of FIG. 1, and the processor 110 may control the computer system 100 such that the program code may be loaded from the program file stored in the permanent storage device 130 to the memory 120 through the bus 140. Here, each of the estimator 210, the similarity calculator 220, the matcher 230, the post-processor 240, and the position provider 250 included in the processor 110 may be different functional representations of the processor 110 to perform operations S310 to S350 by executing an instruction of a portion corresponding to the program code loaded to the memory 120. To execute operations S310 to S350, the processor 110 and the components of the processor 110 may directly process an operation or control the computer system 100 according to a control instruction.

In operation S310, the estimator 210 may perform pose estimation for an input video in response to input of a video file. Here, the estimator 210 may find a position of a human corresponding to a target object with respect to all of the frames of the input video and may calculate the coordinates of the keypoints of each human in the input video.

Figure 4:
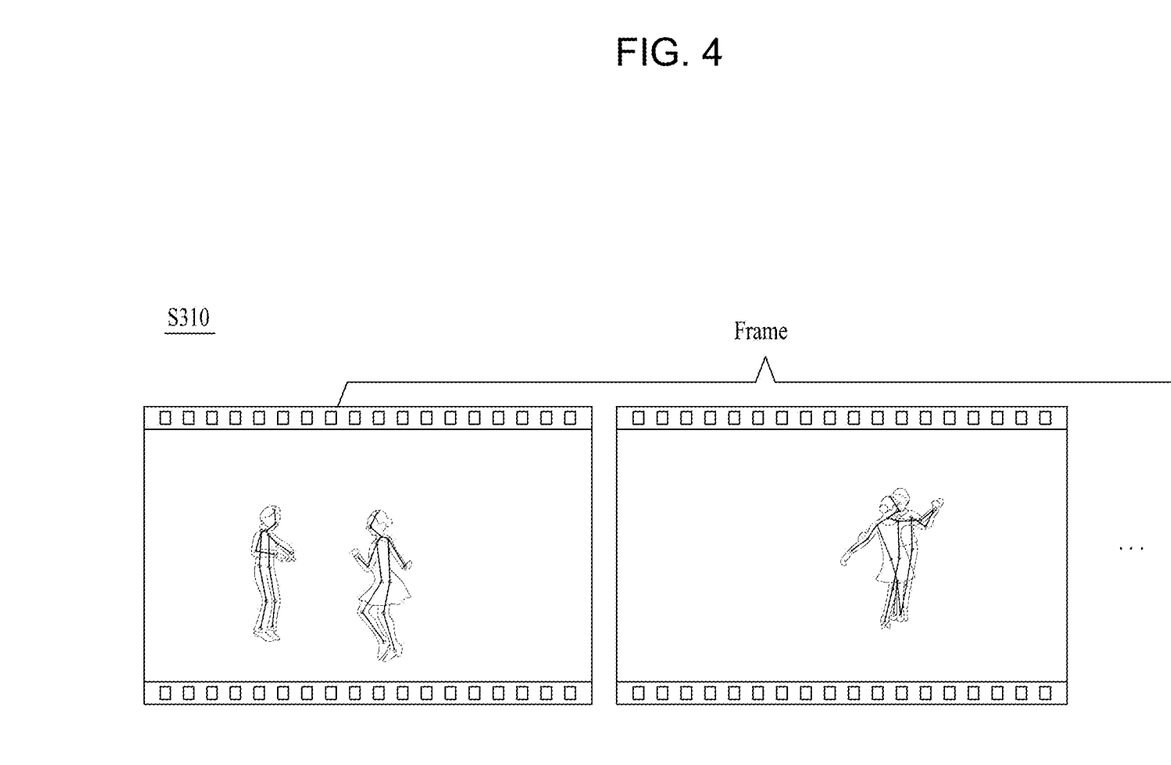
FIG. 4 illustrates an example of a process of calculating coordinates of the keypoints of a target according to an example embodiment.

For example, referring to FIG. 4, after finding the position of one or more persons, a human, that is a target in all of the frames that constitute the input video, coordinates of 17 portions, for example, a head, left and right shoulders, left and right elbows, left and right hands, left and right knees, left and right feet, and the like, may be used as keypoints. For example, the estimator 210 may find a human in a frame through a You Only Look Once (YOLO)-based human detection algorithm and may calculate the coordinates of the keypoints of each human using a top-down method.

Referring again to FIG. 3, in operation S320, the similarity calculator 220 may calculate a pose similarity between adjacent frames based on the coordinates of the keypoints of each human for each frame. That is, the similarity calculator 220 may calculate a matching score representing a pose similarity between humans in two adjacent frames. Here, the matching score may indicate an index representing how close K humans in an nth frame are to K' humans in an (n+1)th frame, respectively.

In particular, the matching score representing the pose similarity herein may include a motion factor according to a local factor and an appearance factor according to a global pattern. A model to calculate the matching score may be implemented as an online training model to which a classifier for classifying an ID of each target is added and a global pattern of each target may be learned through the corresponding online training model.

A classifier model disclosed herein may accumulate training data of each target with a time axis. An example of the training data may include all of the keypoints of a target. That is, a global pattern of each target may be learned through the classifier model. Here, all of network models capable of performing classification may be applied for the classifier for learning the global pattern.

Figure 5:
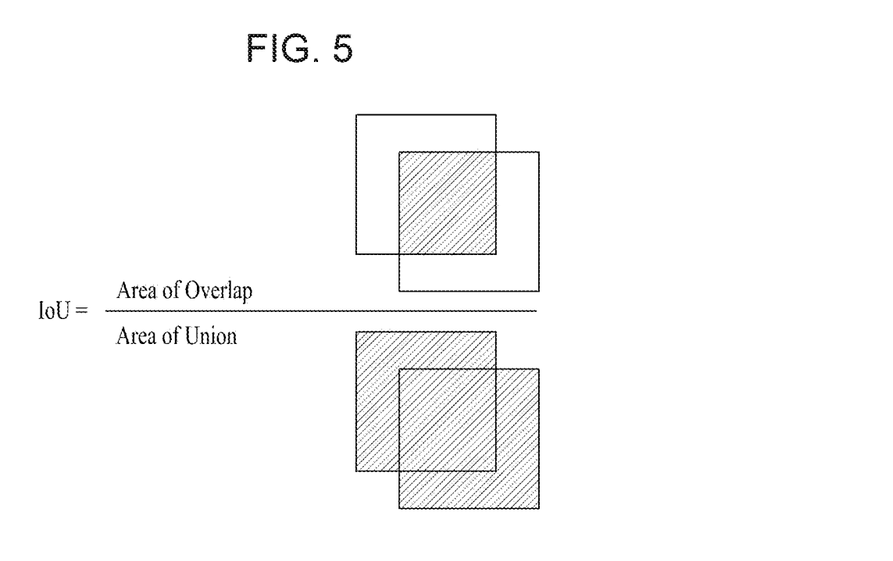
FIG. 5 illustrates an example of a process of measuring an Intersection over Union (IoU) representing a degree of overlapping between areas according to an example embodiment.

The motion factor may be calculated based on a bounding box Intersection over Union (IoU) and a pose IoU representing a position area of a target. Here, IoU represents a degree of overlapping between two areas as illustrated in FIG. 5. Through this, how accurate a prediction value is may be measured in object detection having a ground truth (actual object bound). The appearance factor may be calculated using sample mining and online training-based global pattern matching to determine an objective probability.

Referring again to FIG. 3, in operation S330, the matcher 330 may perform pose matching between frames using results of operation S320. That is, the matcher 230 may match an ith box of the nth frame, that is, a target position, and a jth box of the (n+1)th frame based on the matching score representing the pose similarity.

The matcher 230 may perform pose matching using a matching algorithm, such as, for example, a Hungarian method. The matcher 230 may initially calculate a similarity matrix between adjacent frames, may optimize the similarity matrix with the Hungarian method, and may perform box matching. Here, the similarity matrix for pose matching may be calculated using the motion factor that represents IoU.

In operation S340, the post-processor 240 may perform a post-processing process including excluding false detection with respect to the pose matching results of operation S330. For example, the post-processor 240 may eliminate a matching error through a bounding box IoU-based error measurement. Also, the post-processor 240 may correct the matching error using an interpolation and may further perform smoothing for pose matching based on a moving average.

In operation S350, the position provider 250 may provide a position of each target according to pose matching as tracking results. The position provider 250 may provide a coordinate value of each target as an output. An area in which the position of the target is marked is referred to as a bounding box. Here, the position of the target may be given as position coordinates within a frame of the bounding box. The position coordinates of the target may be expressed in a form of [X coordinate of left line, Y coordinate of upper line, X coordinate of right line, and Y coordinate of lower line], [X coordinate of left line, Y coordinate of upper line, width of rectangle, height of rectangle], and the like.

Figure 6:
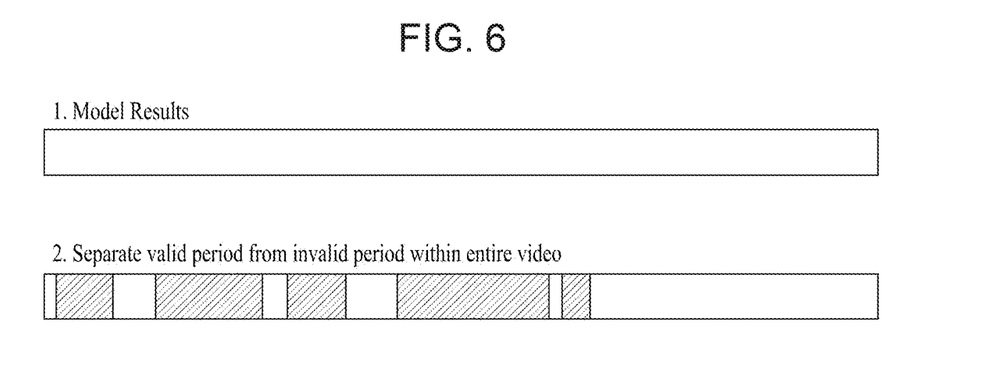
FIGS. 6 and 7 illustrate examples of a process of learning a global pattern of a target according to an example embodiment.
Figure 7:
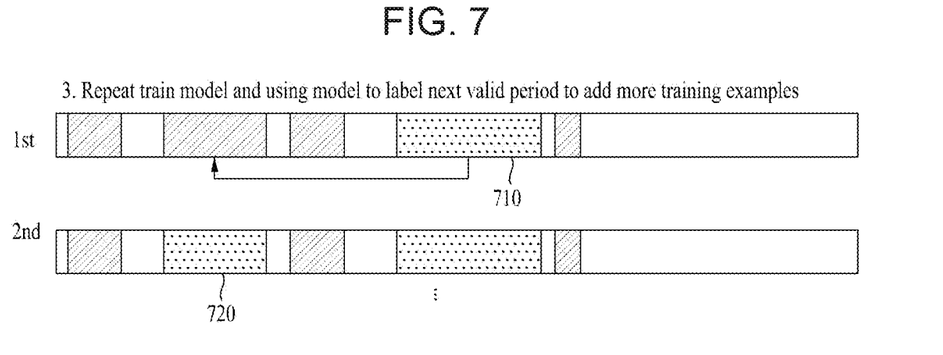

FIGS. 6 and 7 illustrate examples of a process of learning a global pattern of a target according to an example embodiment.

FIGS. 6 and 7 illustrate a sample mining processes.

Referring to FIG. 6, process 1, (1. Model Results) refers to the results of applying the existing tracking technology using a motion factor. The present disclosure may primarily apply the existing tracking method and may secondarily calculate an appearance factor and use the same for object tracking. In process 2, a valid period and an invalid period may be defined and thereby separated within the entire video. Here, the valid period represents a period in which all the targets are present. In FIG. 6, the hatched portions represent the valid period.

Referring to FIG. 7, in process 3, training examples may be added by repeatedly training a model and using the corresponding model to label a next valid period.

Training data uses the entire consecutive period that includes a plurality of frames. Here, an input unit of a training model may be a mini-batch sampled in the entire consecutive period. The size of the mini-batch may be determined as a preset default value or may be determined by a user.

Training data includes a box image including the position of a target and the ID of the corresponding target. Here, the box image represents an image in which only an area corresponding to a position of each human is cut in the entire image.

Output of the training model (network) may be a probabilistic value for each target ID of a corresponding box image when the box image including an arbitrary human is given.

Referring to FIG. 7, in the first stage of training (1st), training data of the first period is generated using the longest valid period 710 and a model is trained using the training data of the first period. Here, the training data may label results acquired using the existing object tracking technology as is and may use a box image and a target ID as training data.

In a second stage (2nd), training data of the second period is generated after labelling a next target period, that is, a second longest valid period 720 using the model trained in the first period. Accumulated training data is generated by merging the training data of the first period and the training data of the second period and the model is trained again using the generated training data.

By repeating the above method, prediction (labelling) is performed for an invalid period using the model trained using a valid period after training for the valid period is terminated.

The aforementioned labelling process may calculate a similarity matrix for a classifier model and may match each box using the calculated similarity matrix. A similarity of the classifier model may be calculated using not the motion factor but the appearance factor.

According to some example embodiments, it is possible to learn a global pattern of each target through an online training model to which a classifier for classifying an ID of each target is added, to generate training data of each target that is accumulated with a time axis and to train the classifier model using the same, and through this, to use both a motion factor according to a local pattern and an appearance factor according to a global pattern for tracking.

The apparatuses described herein may be implemented using hardware components, software components, and/or a combination of the hardware components and the software components. For example, the apparatuses and the components described herein may be implemented using a processing device including one or more general-purpose or special purpose computers, such as, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and/or multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and/or data may be embodied in any type of machine, component, physical equipment, computer storage medium or device, to be interpreted by the processing device or to provide an instruction or data to the processing device. The software also may be distributed over network coupled computer systems so that the software is stored and executed in a distributed fashion. The software and data may be stored by one or more computer readable storage media.

The methods according to the above-described example embodiments may be configured in a form of program instructions performed through various computer devices and recorded in non-transitory computer-readable media. Here, the media may continuously store computer-executable programs or may transitorily store the same for execution or download. Also, the media may be various types of recording devices or storage devices in a form in which one or a plurality of hardware components are combined. Without being limited to media directly connected to a computer system, the media may be distributed over the network. Examples of the media include magnetic media such as hard disks, floppy disks, and magnetic tapes; optical media such as CD-ROM and DVDs; magneto-optical media such as floptical disks; and hardware devices that are specially configured to store program instructions, such as read-only memory (ROM), random access memory (RAM), flash memory, and the like. Examples of other media may include record media and storage media managed by an app store that distributes applications or a site that supplies and distributes other various types of software, a server, and the like.

Although the example embodiments are described with reference to some specific example embodiments and accompanying drawings, it will be apparent to one of ordinary skill in the art that various alterations and modifications in form and details may be made in these example embodiments without departing from the spirit and scope of the claims and their equivalents. For example, suitable results may be achieved if the described techniques are performed in different order, and/or if components in a described system, architecture, device, or circuit are combined in a different manner, or replaced or supplemented by other components or their equivalents. Therefore, other implementations, other example embodiments, and equivalents of the claims are to be construed as being included in the claims.

What is claimed is:

1. An object tracking method for tracking an object in video performed by at least one processor configured to execute computer-readable instructions stored in a memory, the object tracking method comprising:
   training a classifier model using global pattern matching; and
   classifying and tracking each target through online training including the classifier model;
   wherein the training of the classifier model comprises,
   separating a valid period in which all the targets are present in an entire consecutive period of an input video;
   generating first training data after labelling a single valid period among the valid periods and training the classifier model; and
   generating second training data after labelling a next valid period, generating accumulated training data by merging the first training data and the second training data, and repeatedly training the classifier model.

2. The object tracking method of claim 1, wherein the labelling of the single valid period and the next valid period comprises using a similarity matrix of the classifier model that is calculated based on an appearance factor according to a global pattern of a target.

3. The object tracking method of claim 1, wherein the training of the classifier model further comprises performing labelling through the classifier model trained using the valid period with respect to a period aside from the valid period.

4. The object tracking method of claim 1, wherein the tracking of each target comprises:
   finding a position of a target and calculating coordinates of keypoints of each target with respect to all of the frames of the input video;
   calculating a matching score between targets in adjacent frames using the coordinates of the keypoints of each target; and
   performing pose matching between frames based on the matching score between the targets.

5. A non-transitory computer-readable recording medium storing a program for computer-implementing the object tracking method according to claim 1.

6. A computer system for tracking an object in an input video, comprising:
   a memory; and
   at least one processor configured to connect to the memory and to execute computer-readable instructions stored in the memory, wherein the at least one processor is configured to process the steps comprising,
   training a classifier model using global pattern matching; and
   classifying and tracking each target through online training including the classifier model,
   wherein the training of the classifier model comprises,
   separating a valid period in which all the targets are present in an entire consecutive period of an input video;
   generating first training data after labelling a single valid period among the valid periods and training the classifier model; and
   generating second training data after labelling a next valid period, generating accumulated training data by merging the first training data and the second training data, and repeatedly training the classifier model.

7. The computer system of claim 6, wherein the labelling of the single valid period and the next valid period uses a similarity matrix of the classifier model that is calculated based on an appearance factor according to a global pattern of a target.

8. The computer system of claim 6, wherein the training of the classifier model further comprises a process of performing labelling through the classifier model trained using the valid period with respect to a period aside from the valid period.

9. The computer system of claim 6, wherein the tracking of each target comprises:
   a process of finding a position of a target and calculating coordinates of keypoints of each target with respect to all of the frames of the input video;
   a process of calculating a matching score between targets in adjacent frames using the coordinates of the keypoints of each target; and
   a process of performing pose matching between frames based on the matching score between the targets.

* * * * *